United States Patent
De Haan et al.

[11] Patent Number: 6,115,502
[45] Date of Patent: Sep. 5, 2000

[54] NOISE FILTERING

[75] Inventors: Gerard De Haan; Pieter J. Snijder, both of Eindhoven, Netherlands

[73] Assignee: U.S. Philips Corporation, New York, N.Y.

[21] Appl. No.: 08/950,562

[22] Filed: Oct. 15, 1997

[30] Foreign Application Priority Data

Oct. 24, 1996 [EP] European Pat. Off. ............ 96202965

[51] Int. Cl.⁷ ........................................... G06K 9/40
[52] U.S. Cl. ........................... 382/260; 382/275; 348/618; 348/620
[58] Field of Search .................. 348/620, 618, 348/619, 412, 413, 415, 416; 382/260, 261, 262, 263, 264, 265, 275; 358/463

[56] References Cited

U.S. PATENT DOCUMENTS

| | | | |
|---|---|---|---|
| 4,847,909 | 7/1989 | Shibata | 382/264 |
| 5,006,929 | 4/1991 | Barbero et al. | 348/420 |
| 5,442,407 | 8/1995 | Iu | 348/620 |
| 5,510,834 | 4/1996 | Weiss et al. | 348/699 |
| 5,701,163 | 12/1997 | Richards et al. | 382/264 |
| 5,784,115 | 7/1998 | Bozdagi | 348/452 |

*Primary Examiner*—Thomas D. Lee
*Attorney, Agent, or Firm*—Leroy Eason

[57] ABSTRACT

In a motion-dependent noise filtering (MD, NRF), a received image signal and a delayed (3) image signal are combined in dependence upon both a local amount of motion and a global amount of motion in the image signals.

13 Claims, 1 Drawing Sheet

NOISE FILTERING

FIELD OF INVENTION

The invention relates to a method of and circuit for noise filtering, and to an image display apparatus and a multimedia apparatus comprising such a circuit.

In a prior art noise filter, a fresh input signal and a previously filtered signal are combined in the proportion k:(1−k), where k depends on a local amount of motion. In this manner, it is attempted to avoid smear obtained by averaging signals from mutually differing temporal instants in the presence of motion, while the noise filtering is fully active in the absence of motion. It appears, however, that the amount of remaining blur is still subject to improvement.

SUMMARY OF THE INVENTION

It is, inter alia, an object of the invention to provide improved noise filtering. To this end, a first aspect of the invention provides a motion-dependent noise filtering method. A second aspect of the invention provides a motion-dependent noise filtering circuit. Third and fourth aspects of the invention provide an image display apparatus and a multi-media apparatus comprising such a circuit.

In a motion-dependent noise filtering in accordance with a primary aspect of the invention, a received image signal and a delayed image signal are combined in dependence upon both a local characteristic and a global amount of motion in the image signal. Preferably, the local characteristic is a local amount of motion. However, a local amount of noise, or a local amount of high spatial frequencies (detail) can also be used. A "local" characteristic is determined in some (small) neighborhood around a pixel to be processed, whilst a "global" amount of motion is determined with regard to (substantially) a full field, or at least an image region which is substantially larger than the neighborhood in which the "local" characteristic is determined.

These and other aspects of the invention will be apparent from and elucidated with reference to the embodiments described hereinafter.

DESCRIPTION OF THE PREFERRED EMBODIMENTS

In a conventional motion adaptive first-order temporal recursive filter, as proposed in 1 and 2, for every pixel position $\underline{x}=(x, y)^T$, with $^T$ indicating transposition, and an input luminance value F($\underline{x}$, n), the filter output $F_F(\underline{x}, n)$ is defined as:

$$F_F(\underline{x}, n) = kF(\underline{x}, n) + (1-k)F_F(\underline{x}, n-1) \quad (1)$$

where k is a control parameter, defining the filter characteristics and n is the picture number. In an interlaced scan environment $\underline{x}$ has to be increased ($\underline{x}+(0, 1)^T$) or decreased ($\underline{x}-(0, 1)^T$) with one line, as the corresponding pixel in the previous field does not exist. In an advantageous implementation [3] the vertical position is field alternatingly increased or decreased:

$$F_F(\underline{x}, n) = kF(\underline{x}, n) + (1-k)F_F\left(\underline{x} + \begin{pmatrix} 0 \\ (-1)^n \end{pmatrix}, n-1\right) \quad (2)$$

Figure 1:
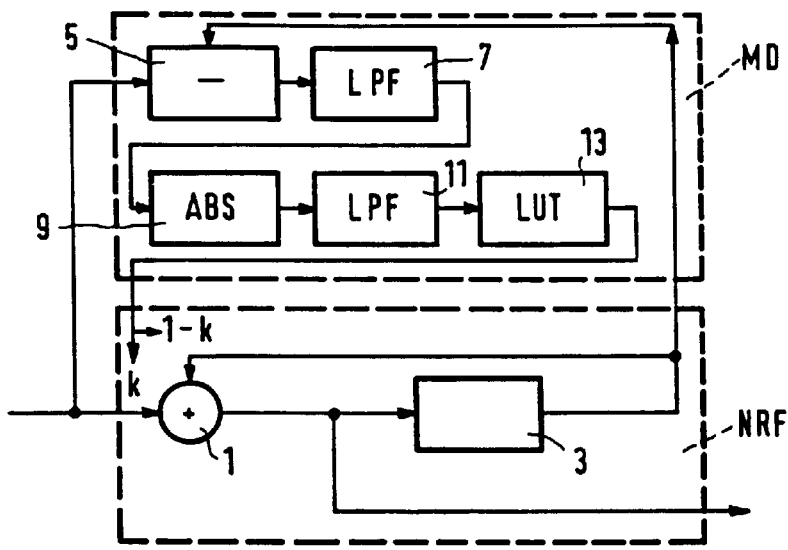
FIG. 1 shows a conventional motion-adaptive first order temporal recursive noise filter.

The variable k is determined with a so-called motion detector, the calculation of which can be expressed as:

$$k(\underline{x}, n) = LUT\left(\sum_{\underline{n}_2 \in N_2}\left[abs\left(\sum_{\underline{n}_1 \in N_1} [F(\underline{x} + \underline{n}_1 + \underline{n}_2, n) - F_F(\underline{x} + \underline{n}_1 + \underline{n}_2, n-1)]\right)\right]\right) \quad (3)$$

where $N_1$ and $N_2$ are (usually small) neighborhoods around the current pixel and LUT is a monotonous, non-linear Look-Up Table function that translates its argument into a value usually between 1/32 and 1. FIG. 1 illustrates the conventional motion-adaptive temporal noise filter.

In the noise filter of FIG. 1, an input signal is applied to a first input of a mixer 1 in a noise reduction filter NRF. An output of the mixer 1 is coupled to its second input thru a field delay 3. The mixer 1 combines the received input signal and the filtered delayed signal in the ratio k:(1−k). The output of the mixer 1 furnishes the output signal of the noise reduction filter NRF.

The input signal and the output of the field delay 3 are also applied to a difference determining circuit 5 in a motion detector MD. The output of the difference determining circuit 5 is fed thru a cascade connection of a first low-pass filter (LPF) 7, an absolute value determining circuit (ABS) 9, a second low-pass filter (LPF) 11, and a look-up table (LUT) 13 which may be formed by a read-only memory. The LUT 13 furnishes the mixing factors k and 1−k.

Although the filter is adapted to weaker filtering in case of local motion, see equation (3), usually some blurring of fine low-contrast detail is unavoidable in moving areas. If the motion detector of equation (3) is set more sensitive in order to prevent this blurring, the noise reduction capability decreases dramatically as the noise itself is seen as motion.

The improvement offered by the present invention is based on the recognition that viewers tend to judge the signal to noise ratio, S/N, in stationary images. When asked for a quality rating it seems that the human observer waits for an image sequence to become stationary at some moment in time, and at that moment the S/N is estimated and assumed constant thereafter.

The gain of a first order temporal recursive noise filter is given by the value of k, in equations (1−3), as determined by the motion detector. This motion detector inherently comprises a compromise between gain and smearing (comet tails). If we combine this fact with the above recognition, it seems to make sense that the sensitivity of the motion detector can be higher in those parts of a sequence in which there is a lot of activity. This enables us to split up the compromise, inherently present in the motion detector, for "highly active" and "nearly stationary" images. As a consequence there can be more noise reduction in near stationary images, and less smearing in highly active pictures.

In a first, experimentally tested, implementation of the above idea, we accumulated a non-linear function H of the field difference, which is input of the motion detector, over a "multi-field period" N−1.

$$A(n) = \sum_{p=N}^{p=1} \sum_{x} H(F(x, n-p) - F(x, n-p-1)) \quad (4)$$

In the experiment H was designed to take the absolute value of the difference, and to scale and clip the contribution of differences above the noise level to more or less the same value. The scaled output of the accumulator was added as a bias to the modified k-curve of the noise filter.

$$k_m(x, n) = k(x, n) + \alpha A(n) \quad (5)$$

Figure 2:
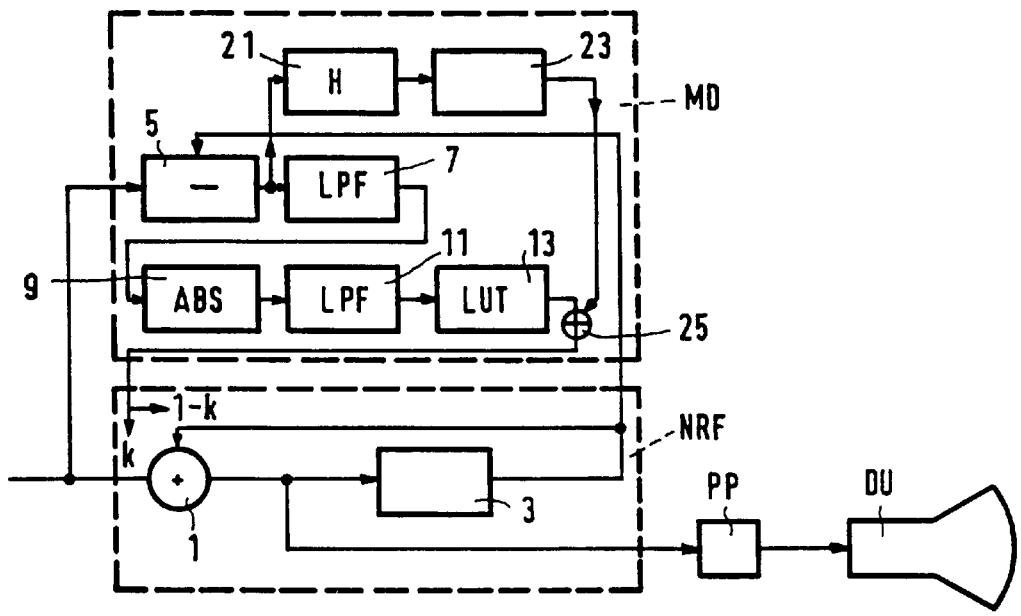
FIG. 2 shows an embodiment of an image display apparatus comprising a recursive embodiment of a noise filter in accordance with the present invention.

The "multi-field period", N−1, has to be selected such that it contains a fixed number of "movement phases". For example, if the source is a video camera it can be one or more field periods, for 25 Hz film material in a 50 Hz TV it should at least be two field periods, and for 24 Hz film in a 60 Hz TV-system it is preferably at least five field periods. FIG. 2 illustrates the idea.

The noise filter of FIG. 2 differs from that of FIG. 1 in that the output of the difference determining circuit 5 is also applied to a cascade connection of a non-linear transfer circuit 21 and an accumulate and scale circuit 23, the output of which is added to the output of the LUT 13 by an adder 25. The output of the noise reduction filter NRF is applied to a display unit DU thru a post-processing circuit PP.

In an alternative implementation, applicable in devices that have access to motion vectors estimated on the picture sequence, the length of motion vectors D(x, n−1) is accumulated over a number of fields prior to the current field, and a (non-linearly) scaled version of this "activity signal" is used to bias the k-curve of the noise filter:

$$A'(n) = \sum_{x} \|D(x, n-1)\| \quad (6)$$

Obviously, instead of applying a bias to the k-curve, similar results can be realised with another "processing" leading to an adaptation of the filter coefficient in dependence on a global "activity signal" (e.g. multiplication).

Figure 3:
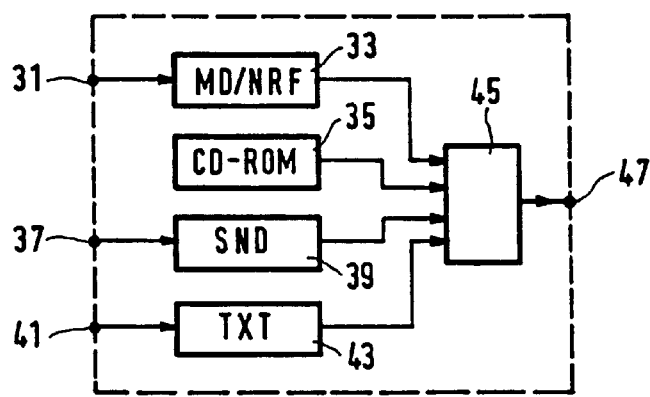
FIG. 3 shows an embodiment of a multi-media apparatus comprising an embodiment of a noise filter in accordance with the present invention.

FIG. 3 shows a multi-media apparatus in accordance with the present invention. The multi-media apparatus has an input 31 for receiving image signals to be processed by a motion-dependent noise reduction filter 33 of the type (MD/NRF) shown in FIG. 2. Further, a CD-ROM player 35 is present. A sound processing unit (sound card SND) 39 receives sound signals from an input 37. Another processor 43 operates on text signals (TXT) received from a keyboard connector 41. Outputs of the devices 33, 35, 39 and 43 are applied to a video unit (graphics card) 45 which furnishes an output video signal to an output 47 to which a monitor (not shown) can be connected.

The invention can be summarized as follows. Motion adaptive first order recursive temporal filters are popular in television noise filtering, but introduce comet tails in moving scenes and cause freezing of the noise as the most annoying defects. The current invention proposes a modification to the control of this classical filter that largely eliminates its disadvantages. More specifically, a preferred embodiment of the invention provides a temporal recursive (first order) noise filter for image data controlled by a local motion detector, characterized in that the relation between the motion detector input and its control output is modified using an "activity signal" indicative of the global amount of motion in the image sequence as measured over a number of previous images. Preferably, the mentioned activity signal results from integrating a non-linear version of the field difference over a number of fields prior to the current field. Alternatively, the mentioned activity signal results from integrating the length of estimated motion vectors over a number of fields prior to the current field. The invention results in that an effective noise filtering is obtained in those image parts in which the user is bothered by noise, while grass fields are no longer misformed into billiard cloth when a panning camera tracks the ball during a football match.

It should be noted that the above-mentioned embodiments illustrate rather than limit the invention, and that those skilled in the art will be able to design many alternative embodiments without departing from the scope of the appended claims. While a recursive embodiment is shown, a transversal filter is also possible, in which, for example, an incoming signal, a delayed signal and a twice delayed signal are combined in dependence upon the local characteristic and the global amount of motion. In the claims, any reference signs placed between parentheses shall not be construed as limiting the claim. The invention can be implemented by means of hardware comprising several distinct elements, and by means of a suitably programmed computer.

REFERENCES

[1] R. N. Jackson and M. J. J. C. Annegarn, "Compatible Systems for High-Quality Television", *SMPTE Journal*, July 1983.

[2] T. Grafe and G. Scheffler, "Interfield Noise and Cross Color Reduction IC for Flicker Free TV Receivers", *IEEE Transactions on Consumer Electronics*, Vol. 34, No. 3, August 1988, pp. 402–408.

[3] J. G. Raven, "Noise suppression circuit for a video signal", UK Patent Application no. GB 2,083,317 A, August 1981, Attorney's docket PHN 9822.

What is claimed is:

1. A motion-dependent method of filtering noise, the method comprising the steps of:
   determining (5–13) a local characteristic in an image signal;
   determining (5, 21, 23) a global amount of motion in the image signal; and
   combining (1) a received image signal and a delayed (3) image signal in dependence upon both (25) said local characteristic and said global amount of motion in the image signal.

2. A method as claimed in claim 1, wherein said local characteristic is a local amount of motion.

3. A method as claimed in claim 2, wherein said global amount of motion determining step (5, 21, 23) includes the step of summing (23) said local amount of motion over the image.

4. A method as claimed in claim 2, wherein said global amount of motion determining step (5, 21, 23) includes the step of summing (23) said local amount of motion over a plurality of field periods.

5. A method as claimed in claim 4, wherein said plurality of field periods include at least two movement phases.

6. A method as claimed in claim 2, wherein said combining step includes the step of adding (25) said local amount of motion and said global amount of motion to obtain a filtering control signal (k).

7. A method as claimed in claim 1, wherein said global amount of motion determining step (5, 21, 23) includes the step of summing motion vectors.

8. A method as claimed in claim 7, wherein said motion vector summing step includes the step of summing horizontal and vertical components of said motion vectors.

9. A method as claimed in claim 1, wherein said global amount of motion determining step (5, 21, 23) includes the step of summing (23) a non-linearly processed (21) signal.

10. A motion-dependent noise filtering circuit (MD, NRF), comprising:

means (5–13) for determining a local characteristic in an image signal;

means (5, 21, 23) for determining a global amount of motion in the image signal; and means (1) for combining a received image signal and a delayed image signal in dependence upon both (25) said local characteristic and said global amount of motion in the image signal, to obtain a noise filtered signal.

11. A motion-dependent noise filtering circuit (MD, NRF) as claimed in claim 10, wherein said local characteristic is a local amount of motion.

12. An image display apparatus, comprising:

a motion-dependent noise filtering circuit (MD, NRF) as claimed in claim 10; and a display unit (DU) for displaying said noise filtered signal.

13. A multi-media apparatus for processing image signals and at least one other item from a group including data, text and/or sound, the apparatus comprising:

a motion-dependent noise filtering circuit (MD, NRF) as claimed in claim 10; and means for furnishing said noise filtered signal and/or said at least one other item.

* * * * *